United States Patent [19]

Willems et al.

[11] Patent Number: 4,487,817

[45] Date of Patent: Dec. 11, 1984

[54] ELECTROCHEMICAL CELL COMPRISING STABLE HYDRIDE-FORMING MATERIAL

[76] Inventors: Johannes J. G. S. A. Willems; Johann R. G. C. M. van Beek; Kurt H. J. Buschow, all of Groenewoudseweg 1, Eindhoven, Netherlands

[21] Appl. No.: 587,795

[22] Filed: Mar. 9, 1984

[30] Foreign Application Priority Data

Oct. 21, 1983 [NL] Netherlands ............. 8303630

[51] Int. Cl.$^3$ ............................................ H01M 4/00
[52] U.S. Cl. ........................................ 429/27; 429/40; 429/218
[58] Field of Search ............. 429/218, 27, 40–45, 429/28, 29

[56] References Cited

U.S. PATENT DOCUMENTS

| | | | |
|---|---|---|---|
| 3,405,008 | 10/1968 | Dilworth et al. | 429/42 |
| 3,850,694 | 11/1974 | Dunlop et al. | 429/27 X |
| 3,980,501 | 9/1976 | Feder et al. | 429/60 |
| 4,112,199 | 9/1978 | Dunlop et al. | 429/29 |
| 4,214,043 | 7/1980 | Deutekom | 429/27 |
| 4,312,928 | 1/1982 | Deutekom | 429/27 |

Primary Examiner—Charles F. LeFevour
Attorney, Agent, or Firm—Norman N. Spain

[57] ABSTRACT

An electrochemical cell having a negative electrode comprising a compound derived from $LaNi_5$, in which La is optionally substituted by a plateau pressure-increasing element and in which Ni is substituted entirely or partly by a plateau pressure-reducing element, for example, Co and/or Cu, with the object of considerably reducing volume steps and hence crack formation of the intermetallic compound during charging and discharging.

Moreover, the corrosion of the intermetallic compound is counteracted by adding small quantities of Al, Cr and/or Si, which metals enhance the formation of a protecting oxide layer.

6 Claims, 1 Drawing Figure

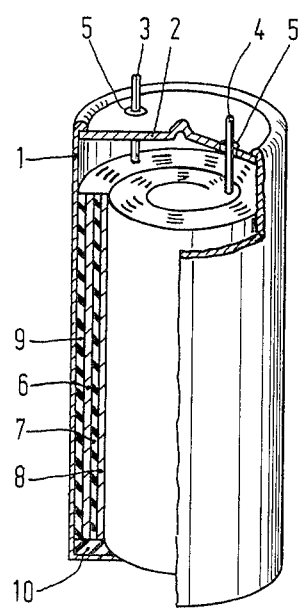

ELECTROCHEMICAL CELL COMPRISING STABLE HYDRIDE-FORMING MATERIAL

The invention relates to an electrochemical cell comprising a negative electrode the electrochemically active material of which consists of an intermetallic compound forming a hydride with hydrogen.

The cell may be in open communication with the atmosphere or may be sealed from the atmosphere. A cell sealed from the atmosphere may have a valve which is proportioned so as to become operative at a previously fixed pressure.

A rechargeable cell of the closed type is described, for example, in U.S. Pat. No. 4,214,043. The electrochemically active part of the positive electrode in this known cell may be nickel hydroxide, silver oxide or manganese oxide, nickel hydroxyde being generally preferred for practical reasons.

The electrochemically active part of the negative electrode consists of an intermetallic compound of lanthanum and nickel having the empirical formula $LaNi_5$. It is known that in hydride-forming intermetallic compounds of this type, both the lanthanum and the nickel can partly be replaced by other metals without the capacity of forming hydrides being lost. For example, the lanthanum may be replaced partly by the other rare earth metals or by calcium, thorium and yttrium, and nickel may be replaced, for example, by copper, cobalt and iron. (See, for example, U.S. Pat. No. 4,312,928).

When in literature there is referred to $LaNi_5$ and intermetallic compounds derived therefrom by substitution, they are to be understood to include generally compounds having the general composition $AB_n$, where n may be between 4.8 and 5.4. These are compounds of the $CaCu_5$-structure comprising the existence range of $AB_5$. The expression "existence range" in this connection means a range of concentrations in a continuous series of intermetallic compounds with which an identical structure can be realized with or without a thermal treatment.

The electrolyte generally consists of an aqueous solution of one or more alkali hydroxides, for example, lithium hydroxide, sodium hydroxide and potassium hydroxide, having a pH exceeding 7.

The cell may furthermore comprise a separator which separates the electrodes electrically but permits transport of ions and gas. The separator may consist of synthetic resin fibres (which may be woven), for example, of polyamide fibres or polypropylene fibres.

When incorporating small quantities of hydrogen in the intermetallic compound $LaNi_5$, the hydrogen dissolves while forming a low-hydrogen hydride phase, which the hydrogen equilibrium pressure above the intermetallic compound increases when the quantity of dissolved hydrogen increases. From the instant the low-hydrogen hydride phase has reached the composition $LaNi_5H_{0.3}$, a new phase having the overall composition $LaNi_5H_{5.5}$ is formed when larger quantities of hydrogen are supplied. These compositions are present at room temperature and are temperature-dependent. When the hydrogen content increases, the quantity of the hydride phase rich in hydrogen increases at the expense of the the quantity of the low-hydrogen hydride phase, while the hydrogen equilibrium pressure above the intermetallic compound remains constant (plateau pressure) until the low-hydrogen hydride phase has been fully converted into the hydride phase rich in hydrogen. Subsequently, an extra quantity of hydrogen may dissolve in the hydride phase rich in hydrogen, with the hydrogen equilibrium pressure above the intermetallic compound increasing.

The plateau pressure can be influenced in negative and positive senses, respectively, by partially replacing lanthanum or nickel by other metals, for example, those previously mentioned. The atomic compositions of the low-hydrogen hydride phase and of the hydride phase which is rich in hydrogen also may vary. The influence of the plateau pressure upon substitution by several metals is additive.

It has been found in practice that the electrochemical capacity of rechargeable cells of the above-mentioned type deteriorates after a number of charging and discharging cycles, even if they are not regularly deeply discharged or strongly overcharged. In Applicants' opinion this problem has so far delayed the application of these cells.

The loss of the electrochemical capacity is the result of corrosion of the hydride-forming intermetallic compound. Compounds which are no longer active in the formation of hydrides are formed at the surface of said compound by oxidation. During charging and discharging of the electrochemical cell, cracks are formed in the hydride-forming intermetallic compound as a result of which the specific area of said compound becomes larger and more and more material is oxidized. Corrosion can be controlled only partly by providing an oxygen-reduction electrode in the cell, as described in German patent specification No. 2,838,857, because lanthanum, at potentials more positive than $-2.0$ V with respect to a reversible hydrogen electrode, reacts with water according to the reaction equation:

$$La+3H_2O \rightarrow La(OH)_3+3H^+ +3e^-.$$

It is the object of the present invention to provide an electrochemical cell having a negative electrode the electrochemically active material of which is based on $LaNi_5$ and which is not subject to corrosion or is subject to corrosion to a much smaller extent than the materials proposed so far, to thus minimize the decrease of the electrochemical capacity.

According to the invention, this object is achieved by means of a negative electrode the electrochemically active material of which consists of an intermetallic compound having the $CaCu_5$ structure of the type and the formula $AB_mC_n$, where m+n is between 4.8 and 5.4, n being between 0.05 and 0.6 in which A consists of Mischmetall or of at least one element selected from the group consisting of Y, Ti, Hf, Zr, Ca, Th, La and the remaining rare earth metals, in which the total atomic quantities of the elements Y, Ti, Hf and Zr may not be more than 40% of A, in which B consists of two or more elements selected from the group formed by Ni, Co, Cu, Fe and Mn, the maximum atomic quantity per gram atom of A being for Ni: 3.5, for Co: 3.5, for Cu: 3.5, for Fe: 2.0 and for Mn: 1.0, and in which C consists of at least one element selected from the group consisting of Al, Cr and Si in the indicated atomic quantities:

Al 0.05–0.6
Cr 0.05–0.5
Si 0.05–0.5.

Mischmetall is a mixture, consisting of more than 50% by weight of Ce, about 25% by weight of La, about 25% by weight of a mixture of other rare-earth metals. The exact composition varies according to the place of origin of the material.

A suitable value of the plateau pressure of the electrochemical cell is achieved if A consists of La or of a mixture of La and one or more of the remaining rare earth metals, the atomic quantity of La being at least as large as the collective quantity of the remaining rare earth metals.

A not too high plateau pressure with a good stability of the electrochemical cell can be achieved if A consists of a mixture of La and Nd.

In a suitable embodiment of the electrochemical cell, B consists of Ni and Co in the following atomic quantities:

Ni1.5–3.5
Co1.5–3.5.

A good stability and a high-rate-discharge capability of the electrochemical cell can be obtained if C is selected from the group formed by Si and Cr, where n is between 0.05 and 0.15.

A particularly good stability of the electrochemical cell is obatined if C consists of Al, where n is between 0.3 and 0.5.

If n is smaller than 0.05 the desired effect of the stabilization occurs to an insufficient extent. The upper limits of n and of the quantity of the elements Fe and Mn are indicated because the elements in question should not be present in such large quantities that the $CaCu_5$ structure of the intermetallic compound is disturbed because the capability to take up hydrogen is then adversely influenced. The upper limits for Ni, Co and Cu are determined by the requirement that the electrochemically active material of the negative electrode must have a distributed affinity for hydrogen.

The invention is based on the discovery that hydride-forming intermetallic compounds which can withstand the strong corrosive conditions in the electrochemical cells of the above-mentioned type can be obtained by the addition of comparatively small quantities of elements which in the pure state form closed oxide layers at their surface when being exposed to the atmosphere, which layers protect the underlying metal from further oxidation, for example, Al, Cr and Si.

The invention is further based an understanding gained as regards the formation of cracks in hydride-forming intermetallic compounds. When the hydrogen content of the intermetallic compound $LaNi_5H_x$ increases, for example during charging a rechargeable cell, the hydrogen equilibrium pressure initially increases while forming a low-hydrogen phase; $LaNi_5H_{0.3}$, until the plateau pressure is reached. When the quantity of hydrogen is further increased, gradually more of the hydrogen-rich phase $LaNi_5H_{5.5}$ is formed from the low-hydrogen phase. Because the hydride phase rich in hydrogen has a specific volume which is 25% larger than that of the low-hydrogen hydride phase, great mechanical stresses arise in the intermetallic compound. When the low-hydrogen hydride phase has been fully converted an hydride phase which is rich in hydrogen, an increase of the hydrogen equilibrium pressure takes place when the hydrogen content increases further. When the hydrogen content in the intermetallic compound decreases the reverse process takes place, the low-hydrogen hydride phase being formed from the hydride phase rich in hydrogen. In this case also, internal mechanical stresses occur in the intermetallic compound in that the two phases coexist. Such mechanical stresses are the cause of crack formation and hence of an increase of the specific area of the intermetallic compound. The result of this is an increasing corrosion of the electrochemical material of the negative electrode under the influence of water and/or oxygen.

The electrochemically active material of the negative electrode in the electrochemical cell according to the invention comprises at least four components, with the result that positions, which may be occupied by hydrogen atoms, which positions have different affinities for hydrogen are present in the metallic structure of the compound. This results in a distributed affinity to hydrogen of the intermetallic compound. In such an intermetallic compound more hydrogen can dissolve before a separation takes place in a low-hydrogen hydride phase and a hydride phase rich in hydrogen, than is the case with $LaNi_5$. The solubility of hydrogen is also larger in the hydride phase rich in hydrogen. The plateau pressure generally is lower than with $LaNi_5$. The intermetallic compounds which are used in the electrochemical cell according to the invention in the case of absorption of hydrogen have a low-hydrogen hydride phase and a hydride phase which is rich in hydrogen, which phases mutually differ less in composition than with $LaNi_5$ and which mutually differ less than 10% in specific volume. As a result of this there are only small mechanical stresses over the phase boundaries as a result of which crack formation and hence corrosion is reduced. Also when hydrogen is supplied to the intermetallic compounds, two hydride phases exist beside each other which show only small differences in specific volume. The result of this is that when an electrochemical cell according to the invention is charged and discharged the capacity remains substantially constant during a large number of cycles.

The desired effect according to the invention is reached only if an intermetallic compound is formed. The desired effect is, on the contrary, not reached by mixing hydride-forming materials having a low plateau pressure and hydride-forming materials having a high plateau pressure because in that case the former material is filled entirely with hydrogen at the low plateau pressure in which large volume variations occur, after which the hydrogen equilibrium pressure increases stepwise to the high plateau pressure in which the latter material is filled with hydrogen. Thus, in a mixture of such hydride-forming materials, a gradual volume variation does not occur.

The intermetallic compound according to the invention has a wide-spread affinity to hydrogen. As a result of this the e.m.f. of the electrochemical cell slightly depends on the charge condition of the cell. The small variation of the e.m.f. during charging and discharging is not detrimental for technical applications of the cell and even has the advantage that the charge condition of the cell can be measured electrically.

The invention will be described in greater detail with reference to the accompanying drawing. In the drawing the sole FIGURE has the following meaning:

FIG. 1 is a partial sectional view and a partial elevation of a closed rechargeable electrochemical cell according to the invention.

EXAMPLE OF A RECHARGEABLE CELL CONSTRUCTION

A cell sealed from the air as is shown in FIG. 1 is formed of a suitable housing 1 of metal, for example stainless steel, having a cover 2 comprising apertures for the conductors 3 and 4. The conductors are insulated from the metal housing 1 and the cover 2 by means of rings 5 of synthetic resin. The outside diameter of the housing may be, for example, 22 mm and its height 41 mm. Inside the housing a roll of a negative electrode 6, a separator 7 and a positive electrode 8 are provided, while the assembly is surrounded by an electrically insulating foil 9 of synthetic resin, for example, polyvinyl chloride, and is supported by a disk 10 of an electrically insulating material, for example, polyvinyl chloride.

The negative electrode 6 is a hydride-forming intermetallic compound as previously described and is connected to the conductor 3. The negative electrode 6 is manufactured by fusing suitable quantities of the relevant elements sintering the intermetallic compound thus formed on a nickel carrier foil as described in U.S. Pat. No. 4,312,928.

The positive electrode 8 is a nickel hydroxide electrode of the conventional sintered type which is connected to the conductor 4. A 6N potassium hydroxide solution in water is used as an electrolyte. The electrolyte is absorbed in the separator 7 and is in wetting contact with the electrochemically active material of the two electrodes. The separator 7 consists of a non-woven membrane of polyamide fibres (nylon).

The free gas space in the cell is approximately 5 cm$^3$. A closed cell of this type has an e.m.f. between 1.2 and 1.4 V. The cells according to the invention can be combined in a conventional manner to form batteries comprising, for example, several series-arranged cells.

EXAMPLES 1-15

(ACCORDING TO THE INVENTION)

The electrochemically active material of the negative electrode is prepared by mixing, fusing and pulverising the quantities of the various components indicated in table 1. An electrode is then made and accommodated in a cell, for example, as previously described. In order to be able to measure the capacity variation of the negative electrode it is efficacious to give the positive electrode comparatively too large a capacity. The initial capacity of the cell is shown in table 1 in mAh per gramme of electrochemically active material of the negative electrode. Furthermore recorded in table 1 is the decrease in capacity of the cell in mAh per gram of electrochemically active material of the negative electrode per charge/discharge cycle. The capacity variation was measured for a few hundred cycles in which the cell was always charged and discharged entirely, with such a current that charging and discharging each took one hour per cycle.

An electrochemically active material to be technically useful must have a capacity decrease of less than 0.30 mAh/g per cycle, preferably less than 0.15 mAh/g.cycle. The materials in table 1 are arranged in a decreasing sequence of stability.

EXAMPLES 16-26

(NOT ACCORDING TO THE INVENTION)

The method is the same as that in the examples 1-15. Materials have been composed which do not satisfy the conditions according to the invention, see numbers 16 to 26 in table 2. The decrease in capacity of these materials is inadmissible large.

The material according to example 17 comprises so much Cr that phase separation occurs as a result of which the CaCu$_5$ structure is disturbed.

The materials according to the examples 19-26 comprise too much Ni and too little Co and/or Cu so that there is too small a spread in the affinity of the material with respect to hydrogen. In such a case too much corrosion of the material takes place upon charging and discharging.

The materials according to examples 16, 18, 19, 22, 25 and 26 comprise no Al, Cr or Si, so that no protective oxide skin is formed.

It appears from table 2 (Example No. 26) that, although LaNi$_5$ has a high initial capacity of 360 mAh/h, the capacity after 100 charge/discharge cycles has already dropped to approximately 180 mAh/g. The materials which according to the invention are preferably used (1 to 12 in table 1) still have substantially the full initial capacity after 100 charge/discharge cycles. The capacity drops to half of the initial value only after more than 1000 charge/discharge cycles.

TABLE 1

| nr. | A | | | ← B | | | ← C | | | initial capacity mAh/g | decrease in capacity mAh/g. cycle |
|---|---|---|---|---|---|---|---|---|---|---|---|
| | La | Nd | Ti | Ni | Co | Cu | Al | Si | Cr | | |
| 1 | 0.9 | — | 0.1 | 2.5 | 2.0 | — | 0.5 | — | — | 270 | 0.02 |
| 2 | 0.7 | 0.3 | — | 2.5 | 2.0 | — | 0.5 | — | — | 265 | 0.03 |
| 3 | 0.7 | 0.2 | 0.1 | 2.5 | 2.0 | — | 0.5 | — | — | 260 | 0.03 |
| 4 | 0.5 | 0.5 | — | 2.5 | 2.4 | — | — | 0.1 | — | 260 | 0.03 |
| 5 | 1.0 | — | — | 2.0 | 3.0 | — | 0.1 | — | — | 280 | 0.04 |
| 6 | 1.0 | — | — | 2.0 | 3.0 | — | — | 0.1 | — | 275 | 0.06 |
| 7 | 0.8 | 0.2 | — | 2.5 | 2.5 | — | 0.1 | — | — | 300 | 0.08 |
| 8 | 0.08 | 0.2 | — | 2.5 | 2.5 | — | — | 0.1 | — | 295 | 0.10 |
| 9 | 0.7 | 0.3 | — | 2.5 | 2.4 | — | 0.1 | — | — | 305 | 0.11 |
| 10 | 0.7 | 0.3 | — | 2.5 | 2.4 | — | — | — | 0.1 | 265 | 0.12 |
| 11 | 1.0 | — | — | 2.5 | 2.5 | — | 0.1 | — | — | 315 | 0.15 |
| 12 | 1.0 | — | — | 2.5 | 2.4 | — | — | 0.1 | — | 305 | 0.15 |
| 13 | 1.0 | — | — | 3.0 | 2.0 | — | — | 0.1 | — | 315 | 0.25 |
| 14 | 1.0 | — | — | 3.0 | — | 2.0 | — | 0.1 | — | 255 | 0.28 |
| 15 | 1.0 | — | — | 3.0 | 2.0 | — | 0.1 | — | — | 315 | 0.30 |

TABLE 2

| nr. | A | | | B | | | C | | | initial capacity mAh/g | decrease in capacity mAh/g. cycle |
|---|---|---|---|---|---|---|---|---|---|---|---|
| | La | Nd | Ti | Ni | Co | Cu | Al | Si | Cr | | |
| 16 | 1.0 | — | — | 2.5 | 2.5 | — | — | — | — | 325 | 0.46 |
| 17 | 0.7 | 0.3 | — | 2.5 | 2.0 | — | — | — | 0.8 | 240 | 0.46 |
| 18 | 0.9 | — | 0.1 | 3.0 | 2.0 | — | — | — | — | 310 | 0.50 |
| 19 | 0.7 | 0.2 | 0.1 | 5.0 | — | — | — | — | — | 270 | 0.57 |
| 20 | 1.0 | — | — | 4.0 | — | 1.0 | — | 0.1 | — | 290 | 0.57 |
| 21 | 0.9 | — | 0.1 | 4.5 | — | — | 0.5 | — | — | 310 | 0.58 |
| 22 | 0.9 | — | 0.1 | 4.0 | — | 1.0 | — | — | — | 280 | 0.58 |
| 23 | 1.0 | — | — | 4.0 | 1.0 | — | — | 0.1 | — | 350 | 0.81 |
| 24 | 1.0 | — | — | 4.0 | 1.0 | — | 0.1 | — | — | 360 | 0.86 |
| 25 | 1.0 | — | — | 4.0 | — | 1.0 | — | — | — | 320 | 0.92 |
| 26 | 1.0 | — | — | 5.0 | — | — | — | — | — | 360 | 1.54 |

What is claimed is:

1. An electrochemical cell comprising a positive electrode, an aqueous alkaline electrolyte, and comprising a negative electrode the electrochemically active material of which consists of an intermetallic compound forming a hydride with hydrogen, characterized in that the electrochemically active material of the negative electrode consists of an intermetallic compound having the CaCu$_5$ structure of the type of the formula AB$_m$C$_n$, where m+n is between 4.8 and 5.4, in which n is between 0.05 and 0.6, in which A consists of Mischmetall or of at least one element selected from the group consisting of Y, Ti, Hf, Zr, Ca, Th, La and the remaining rare earth metals, in which the total atomic quantities of the elements Y, Ti, Hf and Zr may not be more than 40% of A, in which B consists of two or more elements selected from the group formed by Ni, Co, Cu, Fe and Mn, the maximum atomic quantity per gram atom of A being for Ni: 3.5, for Co: 3.5, for Cu:3.5, for Fe:2.0 and for Mn:1.0, and in which C consists of at least one element selected from the group formed by Al, Cr and Si in the following indicated atomic quantities:

Al0.05–0.6,
Cr0.05–0.5 and
Si0.05–0.5.

2. An electrochemical cell as claimed in claim 1, characterized in that A is La or a mixture of La and one or more of the remaining rare earth metals, the atomic quantity of La being at least as large as the total quantity of the remaining rare earth metals.

3. An electrochemical cell as claimed in claim 2, characterized in that A consists of a mixture of La and Nd.

4. An electrochemical cell as claimed in claim 1 characterized in that B consists of Ni and Co in the following atomic quantities:
Ni1.5–3.5 and
Co1.5–3.5.

5. An electrochemical cell as claimed in claim 1 characterized in that C is selected from the group consisting of Si and Cr, where n is between 0.05 and 0.15.

6. An electrochemical cell as claimed in claim 1 characterized in that C consists of Al, where n is between 0.3 and 0.5.

* * * * *